United States Patent [19]

Czerwick et al.

[11] Patent Number: 4,621,721

[45] Date of Patent: Nov. 11, 1986

[54] SYSTEM FOR NEUTRAL POSITION SHIFT LEVER CLUTCH DISENGAGEMENT

[75] Inventors: Henry E. Czerwick, Dearborn; Richard A. Petts, Detroit; Raymond R. Russell, Garden City, all of Mich.

[73] Assignee: Ford Motor Company, Dearborn, Mich.

[21] Appl. No.: 670,716

[22] Filed: Nov. 13, 1984

[51] Int. Cl.⁴ .............................................. B60K 41/28
[52] U.S. Cl. .............................. 192/0.052; 192/0.092; 192/109 F
[58] Field of Search ................. 192/3.59, 3.58, 3.57, 192/3.56, 3.55, 3.54, 0.052, 0.08, 0.092, 109 F, 109 D

[56] References Cited

U.S. PATENT DOCUMENTS

| | | | |
|---|---|---|---|
| 2,637,425 | 5/1953 | Long et al. | 192/3.58 X |
| 2,889,718 | 6/1959 | Schjolin et al. | 74/732 |
| 2,975,875 | 3/1961 | Edelblut | 192/3.5 |
| 3,204,730 | 9/1965 | Alfieri et al. | 192/0.08 |
| 3,263,782 | 8/1966 | Smirl et al. | 192/3.5 |
| 3,327,817 | 6/1967 | Ivanchich | 192/0.08 X |
| 3,752,284 | 8/1973 | Brittain et al. | 192/103 F |
| 3,905,459 | 9/1975 | Liebich | 192/109 F |
| 4,199,048 | 4/1980 | Ishikawa | 192/0.052 |

Primary Examiner—George H. Krizmanich
Attorney, Agent, or Firm—Frank G. McKenzie; Donald J. Harrington

[57] ABSTRACT

In a motor vehicle equipped with a countershaft manual transmission for producing various ratios of the speed of an engine that is clutched to the transmission and the speed of a transmission output shaft, a system for maintaining the clutch disengaged while the transmission shift lever is in the neutral position and the clutch pedal is released includes a hydraulic damper actuated by a clutch pedal arm that moves a piston within a master cylinder connected hydraulically through an interrupter valve to a slave cylinder, which is connected mechanically to a clutch arm whose movement engages and disengages the clutch. An electrical circuit includes an ignition switch in series with a neutral switch and with a clutch switch, an interrupter valve coil in series with the switches and a clutch switch relay in parallel with the clutch switch. When the electrical circuit is closed, the interrupter valve closes hydraulic communication between the master cylinder and the slave cylinder.

13 Claims, 5 Drawing Figures 4,621,721

SYSTEM FOR NEUTRAL POSITION SHIFT LEVER CLUTCH DISENGAGEMENT

BACKGROUND OF THE INVENTION

1. Field of the Invention

This invention relates to the field of clutches, more particularly to control systems for engaging and disengaging clutches. The invention pertains to the control of a clutch that driveably connects an automotive engine and a manual transmission.

2. Desription of the Prior Art

A manual transmission for use in an automotive vehicle is generally connected to the engine through a friction clutch whose engagement and disengagement is determined by the manual movement of a clutch pedal under the control of the vehicle operator. In manual countershaft transmissions, an input speed reduction gearset continuously connects the output of the clutch to the countershaft so that as the clutch is engaged the countershaft rotates. The various forward speed ratios of the transmission are produced by gear and pinion pairs including output gears journalled on the output shaft and pinions formed integrally with the countershaft. Synchronizer clutches, each one located between two of the output gears, alternately connect the gears to the output shaft when the synchronizer is moved into engagement with clutch teeth formed integrally with the output gears.

When the vehicle operator places the transmission in the neutral position where the synchronizer clutches are not engaged with either of the associated output gears, the friction clutch is engaged and power is transmitted through the input gearset to the countershaft whose rotation causes all of the output gears that are rotatably supported on the output shaft to turn with the countershaft. While the drive system is so disposed, variations in engine speed will cause the countershaft speed to vary. The clearances present between adjacent teeth on the countershaft pinions and the output gear tooth located between the pinion teeth are continuously undergoing change as the countershaft speed varies. In extreme conditions, while the driveline is set for neutral operation with the clutch engaged, the teeth of the mating gears and pinions impact. This condition called neutral rollover rattle is sensed by the vehicle operator as an unwanted noise produced in the idle condition with the transmission operating in the neutral position.

SUMMARY OF THE INVENTION

It is preferably in a manual countershaft transmission that the countershaft be disconnected from the engine whenever the clutch pedal is released and the gearshift selector is in the neutral position, such as when the vehicle is stopped momentarily in the idle condition. The system according to the present invention is adapted to produce normal clutch engagement and disengagement through manual operation of the clutch pedal by the vehicle operator, provided the transmission shift selector is in a position other than the neutral position. This system is adapted to automatically disengage the clutch when the shift selector is moved to the neutral position and the clutch pedal is depressed. In this way, a vehicle equipped with a manual countershaft transmission will not experience neutral rollover noise, because the countershaft is driveably disconnected automatically from the input gearset and the engine when the transmission is disposed for neutral operation.

The system according to the present invention is for use in a motor vehicle equipped with a countershaft manual transmission that produces various ratios between the speed of an engine that is clutched to the transmission and the speed of the transmission output shaft. The system, which maintains the clutch disengaged while the transmission shift lever is in the neutral position and the clutch pedal released, includes a hydraulic damper actuated by a clutch pedal arm that moves a piston within a master cylinder connected hydraulically through an interrupter valve to a slave cylinder, which is connected mechanically to a clutch arm whose movement engages and disengages the clutch. An electrical circuit includes an ignition switch in series with a neutral switch and with a clutch switch, an interrupter valve coil in series with the switches and a clutch switch relay in parallel with the clutch switch. When the electrical circuit is closed, the interrupter valve closes hydraulic communication between the master cylinder and the slave cylinder.

DESCRIPTION OF THE PREFERRED EMBODIMENT

Figure 1:
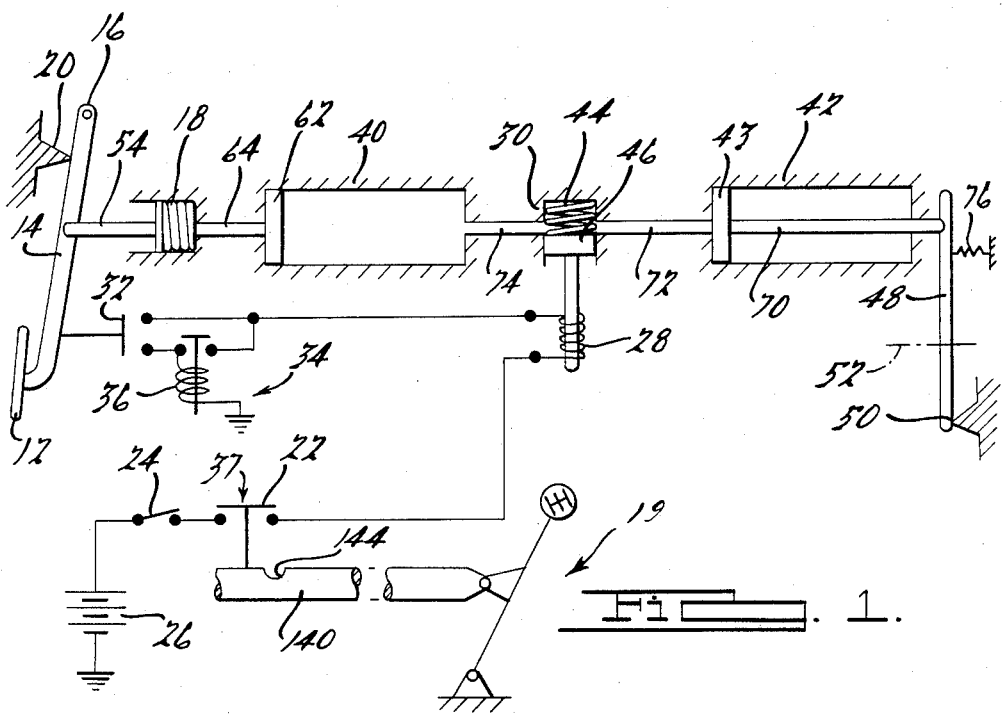
FIG. 1 shows the components of the system when the vehicle is parked with the ignition switch open.

Referring first to FIG. 1, an automotive vehicle equipped with a manual transmission connected by a hydraulically actuated clutch to the driveshaft of an internal combustion engine is equipped with a clutch pedal 12 located at the end of the clutch pedal arm 14, which is mounted for rotation about a pivot 16. The clutch pedal arm is biased by a compression damper spring 18 to a disengaged position where the arm contacts a stop 20, which prevents clockwise rotation about pivot 16. The pedal is rotated counterclockwise manually by the vehicle operator when shifts are made among the speed ratios of the transmission.

Figure 3:
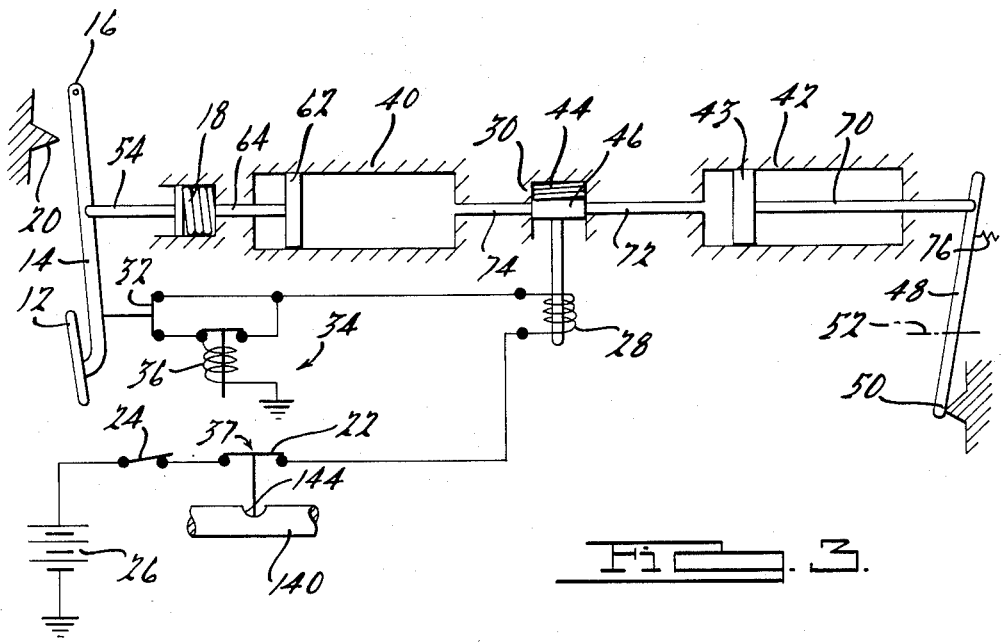
FIG. 3 shows the system with the ignition switch closed, the clutch pedal depressed and the transmission gear selector in the neutral position.

Usually a manual transmission has at least one shift rail 140, which is connected to the gear selector mechanism 19 and on which the shift forks are carried. The shift forks move the synchronizer clutch sleeves into and out of engagement with the forward drive gears, such as those described in U.S. Pat. No. 4,377,093, the entire disclosure of which is incorporated herein by reference. In FIG. 3 of this patent, the shift rail 140 is shown slideably mounted on the casing of the transmission and having a spring-loaded detent that can engage a neutral position recess 144 in addition to other such recesses on the shift rail as the shift rail is moved with respect to the location of the detent.

Figure 4:
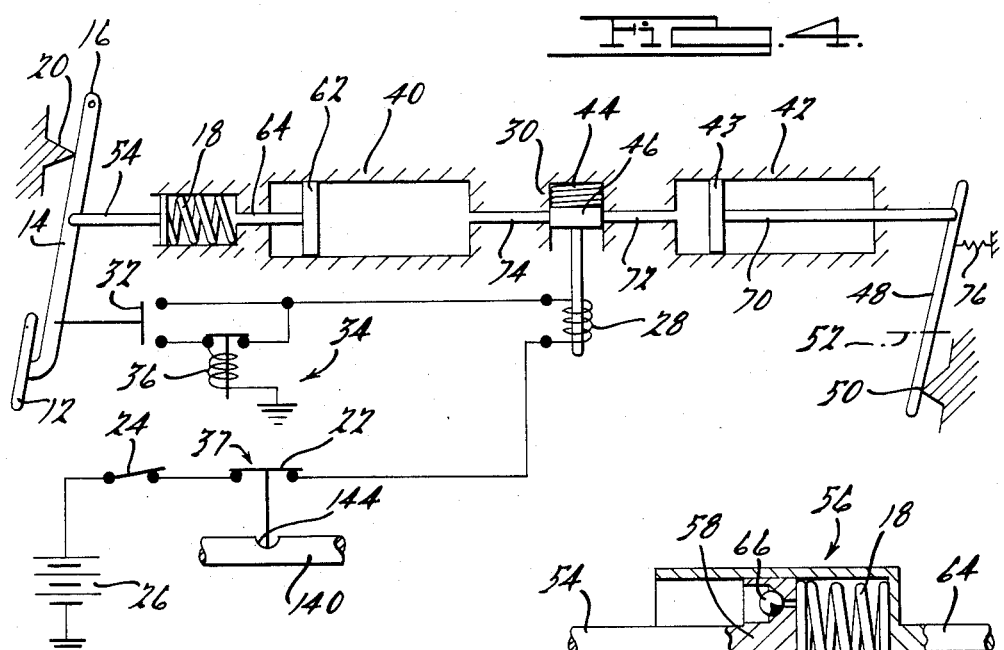
FIG. 4 is similar to FIG. 3 except that the clutch pedal is not depressed.

The system according to the present invention includes a neutral position electrical switch 37 having an element 22 that contacts the shift rail and moves in accordance with the position of the shift rail to an open position when the rail is disposed in a position other than the neutral position (as in FIGS. 1 and 2), and moves to a closed position when the shift rail is moved to the neutral position (as shown in FIGS. 3 and 4). An ignition switch 24, controlled manually by the vehicle operator, connects one terminal of the battery 26 to the neutral switch. The electrical circuit further includes a solenoid coil 28 connected between the neutral switch and a clutch switch 32, which is closed when the clutch pedal is depressed and open when the clutch pedal is released. A relay 34 whose terminals are in parallel with the terminals of clutch switch 32 includes a coil 36 arranged in series with the clutch switch and connected to ground.

The clutch pedal arm 14, when pivoted about point 16, compresses the hydraulic fluid in a master cylinder 40, which is hydraulically connected to a slave cylinder 42 through interrupter valve 30. While coil 28 is de-energized, communication between cylinders 40 and 42 is maintained by the force of spring 44 that moves the valve element 46 downward. This communication is interrupted, however, when coil 28 is energized because a force is developed on the valve element 46 opposite the direction of the force of spring 44 tending to move lhe valve element upward to the position shown in FIGS. 3 and 4.

The piston that moves within the slave cylinder is connected to a clutch arm 48, which is adapted to rotate about the clutch housing pivot 50. The location of the centerline of the clutch bearing 52 is shown for reference. Clockwise rotation of arm 48 causes the clutch to disengage the engine from the transmission and counterclockwise rotation of arm 48 causes the clutch to engage the engine and transmission. The force produced by compression spring 76 tends to restore arm 48 to the engaged position.

Figure 5:
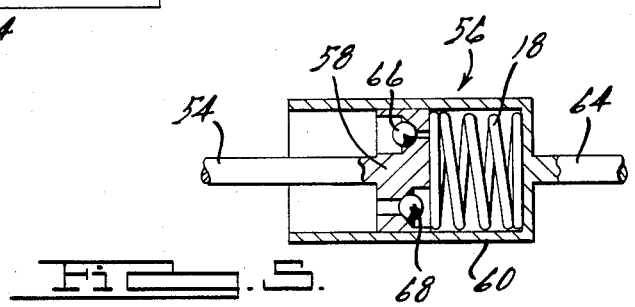
FIG. 5 is a cross section through the clutch damper.

Referring now to FIG. 5, the clutch pedal arm 14 is mechanically connected to damper 56 by a piston rod 54, which is rotatably mounted on pedal arm 14 and is formed at its opposite end with a piston 58 that moves within the damper cylinder 60. Piston 62, which moves within master cylinder 40, is connected by piston rod 64 to the damper cylinder 60 so that they move as a unit. Hydraulic fluid is present in cylinder 60 on both sides of the damper piston, which is formed integrally with first and second check valves 66, 68. The hydraulic fluid can flow through check valve 68 from the left side to the right side of piston 58 when spring 18 expands and the hydraulic fluid can flow through check valve 66 from the right side to the left side of piston 58 when the spring contracts. However, because the orifice of check valve 68 is smaller than the orifice of check valve 68, when foot pressure is applied to clutch pedal 12, the spring contracts at a slightly slower rate than it expands.

Pressure within the master cylinder keeps damper spring 18 compressed against damper piston 58 regardless of whether the clutch pedal is applied or released, provided interrupter valve 30 is open. But when the interrupter valve is closed, the body 60 of damper 56 and the master cylinder piston 62, to which the damper body is attached, remain stationary. In this condition, damper spring 18 pushes on piston 58 and returns the pedal to the released position against the clutch arm stop 20 as shown in FIG. 4. Fluid within the damper on the left side of the piston is displaced through check valve 68 and applies little or no resistance to the action of the spring tending to restore the pedal to the released position.

When foot pressure is applied to the clutch pedal, fluid within the damper is displaced through orifice check valve 66 and the spring contracts at a slightly slower rate than the rate at which it expands. When the clutch pedal is applied and interrupter valve is closed, the damper assembly moves rightward compressing the fluid in the master cylinder, forcing piston 43 of the slave cylinder rightward, pivoting clutch arm 48 and moving the clutch throwout bearing 52, thereby disengaging the clutch. The clutch is disengaged shortly before the damper spring is fully compressed. Because of this short delay, the clutch is fully disengaged although the fluid in the damper passing from the right side of piston 58 to the left side of the piston through check valve 66 slows the application of the clutch pedal. Finally, all the damper fluid passes through the check valve 66 and permits spring 18 to be fully compressed.

When the components of the system are located as shown in FIG. 4 and then the ignition switch 24 or neutral switch 22 is opened, the clutch disengages immediately because interrupter valve 30 opens as the electrical circuit is opened by the change of state of the neutral switch or ignition switch. When the clutch is released, the force of spring 76 is applied through connecting arm 20 to the slave piston 48 which moves leftward within the slave cylinder forcing the hydraulic fluid through lines 72, 74 into the master cylinder, and piston 62 to the left end of the master cylinder. However, the damper dissipates a portion of the energy released as the clutch is disengaged by throttling the damper fluid through check valve 66 in order to permit piston 62 to move to the top of master cylinder 40. In this way, the abrupt application of the clutch spring force is prevented from causing impact between pistons 62 and 43 of the master cylinder and slave cylinder, respectively, and the noise and shock loading that otherwise would result is avoided.

FIG. 1 shows the relative positions of the components of this system and the positions they occupy when the vehicle is parked and with the ignition turned off. The neutral switch and clutch switch are open and the clutch is engaged.

Figure 2:
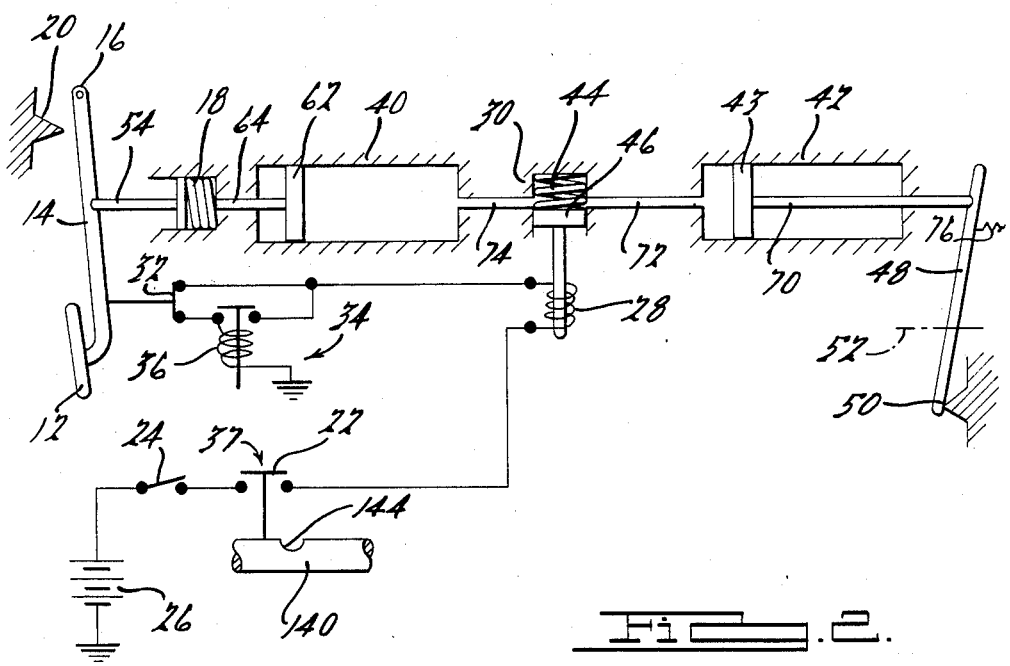
FIG. 2 shows the system with the clutch pedal depressed and before the ignition switch is closed.

FIG. 2 shows the components after the operator has depressed the clutch pedal, which action closes clutch switch 32 and forces hydraulic fluid in the master cylinder through the interrupter valve and into the slave cylinder.

FIG. 3 shows the system with the clutch pedal depressed, the ignition on and the neutral position switch closed. In this condition, the electrical circuit is closed and the interrupter valve is closed because valve element 46 moves upward within the interrupter valve body. When this valve closes, the slave cylinder is sealed and the clutch is maintained disengaged. Any subsequent movement of shift rail 140 from the neutral position, reopens the interrupter valve and permits the clutch to be operated manually by the vehicle operator by movement of the clutch pedal.

FIG. 4 shows a condition, similar to that of FIG. 3, but after the clutch pedal is released. This is the condition in which neutral rollover rattle is experienced in conventional drivelines because while the clutch is engaged, the engine is normally driveably connected through the clutch and the input gearing to the countershaft, which rotates at a speed corresponding to the reduction ratio of the input gearing and the engine speed, though the transmission is set for neutral. Slight accelerations and decelerations of the engine transmitted to the countershaft cause the clearances between the gears journalled on the output shaft and the pinions on the countershaft to be repetitively taken up. This can cause impact loading between the mating gears and pinions.

However, through operation of the system according to the present invention, while the transmission is in the neutral position, the clutch is disengaged and held in that position as long as interrupter valve is closed. In this case, therefore, the countershaft is not driven from the engine when the transmission is in the neutral position and neutral rollover noise is avoided. Yet, the clutch pedal is released because of the restoring force applied to the pedal by the damper spring, which moves the pedal clockwise into contact with clutch arm stop 20. The clutch switch 32 remains closed because coil 36, which was energized when the electrical circuit was closed, moves its contact 37 into engagement with the terminals of the relay 34. In this way, electrical current through the interrupter valve coil 18 is maintained as long as the ignition switch and the neutral sensing switch remain closed despite the opening of clutch switch 32 as the pedal is released.

The system is restored to the condition shown in FIG. 1 when the operator turns the ignition off or moves the shift lever from the neutral position, which opens the neutral sensing switch 22. When this occurs, coil 18 is deenergized, interrupter valve 30 is opened and the clutch is reengaged because hydraulic fluid flows from the slave cylinder into the master cylinder causing it to compress the damper spring between piston 58 and master cylinder piston 62.

Having described the preferred embodiments of our invention, what we claim and desire to secure by U.S. Letters Patent is:

1. A system for controlling the operation of a clutch that connects and disconnects a power source and a transmission having a gear selector moveable into and away from a neutral position as a clutch actuator is moved comprising:
    a manually operated actuator moveable between a clutch applied position and a clutch released position;
    a master cylinder containing a piston connected to the manual actuator;
    a slave cylinder hydraulically connected to the master cylinder containing a piston connected to the clutch actuator;
    valve means for opening and closing communication between the master cylinder and slave cylinder; and
    means for closing the valve when the transmission gear selector is in the neutral position and for opening the valve when the gear selector is not in the neutral position.

2. The system of claim 1 further comprising a damper assembly that includes:
    a damper cylinder connected to the master cylinder piston;
    a damper piston located within the damper cylinder for reciprocal displacement, connected to the manually operated actuator;
    spring means located within the damper cylinder for biasing the manual actuator toward the released position; and
    means limiting the rate at which the damper piston moves within the damper piston.

3. The system of claim 2 wherein the limiting means includes:
    a first check valve carried on the damper piston, adapted to permit fluid to flow therethrough in a first direction through a first orifice and to prevent fluid to flow therethrough in the opposite direction.

4. The system of claim 3 wherein the limiting means further includes a second check valve carried on the damper piston, adapted to permit fluid to flow therethrough opposite the first direction through a second orifice larger than the first orifice and to prevent fluid to flow therethrough in the first direction.

5. The system of claim 1 wherein the valve means includes a valve element moveable between an open position where communication is open between the master cylinder and slave cylinder and a closed position where said communication is closed and a spring for biasing the valve element toward the open position, and wherein the closing means includes a solenoid adapted to force the valve element to the closed position when the coil of the solenoid is energized.

6. The system of claim 5, wherein the opening and closing means includes:
    a source of electrical power;
    a neutral sensing switch that connects the solenoid coil to the electrical power source when the transmission gear selector is in the neutral position and disconnects the electrical power source from the solenoid coil when the gear selector is not in the neutral position.

7. The system of claim 6 wherein the opening and closing means further includes a clutch switch connected in a series with the solenoid coil, neutral sensing switch and electrical power source.

8. The system of claim 7 wherein the clutch switch includes:
    a first set of circuit terminals;
    a first element connected to the manual actuator adapted to contact the circuit terminals and to close the circuit when the manual actuator moves to the disengaged clutch position and to open the circuit when the manual actuator moves away from the disengaged clutch position.

9. The system of claim 8 wherein the clutch switch further includes a second set of circuit terminals in circuit parallel arrangement with the first set of terminals, a second element adapted to move into and out of contact with the second set of terminals, a second solenoid coil arranged in series with the first set of terminals and with one terminal of the second set of terminals, the second element being adapted to contact the second set of terminals and to close the circuit when the second solenoid coil is energized.

10. The system of claim 6 wherein the opening and closing means further includes an ignition switch that opens and closes the electrical circuit.

11. The system of claim 7 wherein the opening and closing means further includes an ignition switch that opens and closes the electrical circuit.

12. The system of claim 8 wherein the opening and closing means further includes an ignition switch that opens and closes the electrical circuit.

13. The system of claim 9 wherein the opening and closing means further includes an ignition switch that opens and closes the electrical circuit.

* * * * *